J. R. FLEMING.
CAR WHEEL SLIDE SHOE.
APPLICATION FILED MAR. 8, 1912.
1,042,900.
Patented Oct. 29, 1912.
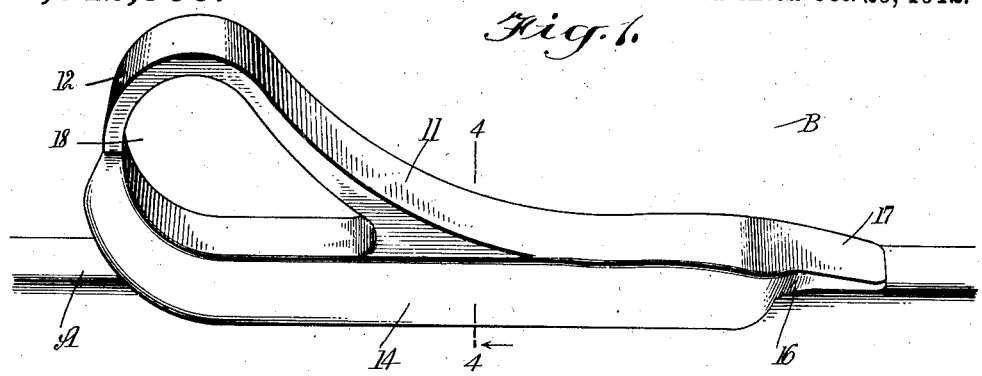
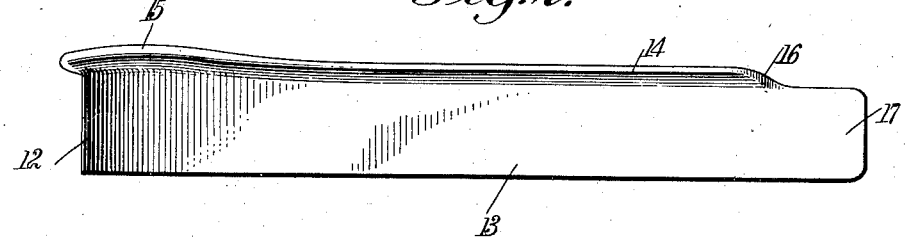
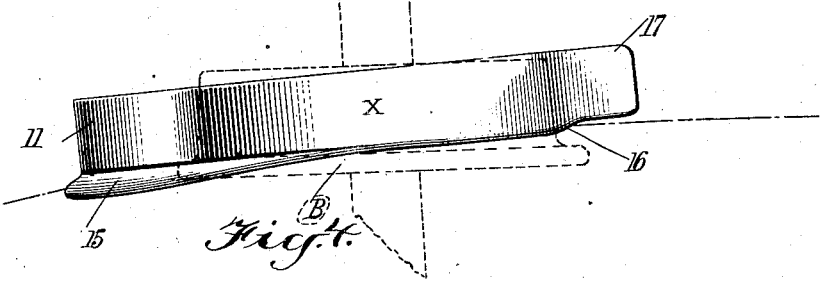
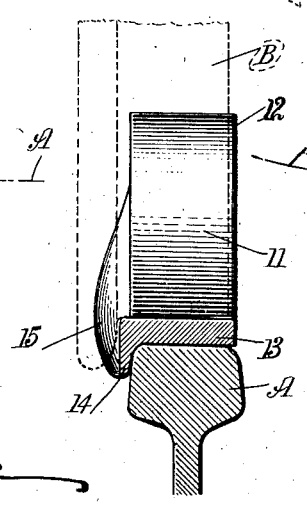
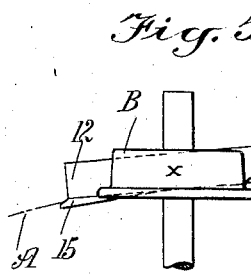
WITNESSES
INVENTOR
James R. Fleming
BY
ATTORNEYS

UNITED STATES PATENT OFFICE.

JAMES R. FLEMING, OF SCRANTON, PENNSYLVANIA.

CAR-WHEEL SLIDE-SHOE.

1,042,900. Specification of Letters Patent. Patented Oct. 29, 1912.

Application filed March 8, 1912. Serial No. 682,388.

*To all whom it may concern:*

Be it known that I, JAMES R. FLEMING, a citizen of the United States, and a resident of Scranton, in the county of Lackawanna and State of Pennsylvania, have invented a new and Improved Car-Wheel Slide-Shoe, of which the following is a full, clear, and exact description.

Among the principal objects which the present invention has in view are: to provide a support for car wheels to prevent the rotation of said wheels; to provide a sliding means for supporting the said wheels and car connected therewith; to provide a shoe of the character described, adapted to bridge across the frogs or other rail junctions on which the said car is mounted; and to provide a shoe of the character mentioned having means for laterally adjusting the wheels of the car to permit the same to perform their ordinary function.

Reference is to be had to the accompanying drawings forming a part of this specification, in which similar characters of reference indicate corresponding parts in all the views, and in which—

Figure 1 is a perspective view of a wheel slide constructed and arranged in accordance with the present invention; Fig. 2 is a bottom plan view of the slide; Fig. 3 is a top plan view of the slide, showing in dotted lines a car wheel resting thereon, and in broken lines a car track curved and controlling the path of the said slide; Fig. 4 is a vertical section taken on the line 4—4 in Fig. 1, showing in dotted lines a car wheel resting on the slide; and Figs. 5 and 6 are diagrammatic views to illustrate the operation of the slide under the car wheel when same approaches a curved portion in the track of the roadbed.

Devices of the character shown in the accompanying drawings are employed in lieu of what are termed "sprags." "Sprags" are short pieces of timber, bars or other suitable devices, which may be extended between the wheels and car body, to hold the wheels against movement and to compel the same to slide.

The practice relates more particularly to the service in which mine cars are employed. The objection to this practice is that the wheels of the cars are flattened and ruined.

The shoe disclosed in the accompanying drawings is provided with a body portion 13, which is flattended to form a slide on the track rails A. The forward end of the body portion 13 is upwardly curved to form a loop 12. From the top of the loop 12, and joining the top of the body 13, is an inclined portion 11, which forms a chock and rest for the car wheel B. The curve of the inclined portion 11 is greater than the curvature of the rim of the wheel B. The body 13 is provided at the end thereof with a tongue 17, which is drawn downward from the upper part of the body 13 to form an incline for the wheel B to ride onto the shoe and body portion 13 thereof. The shoe 13 has formed thereon and disposed lengthwise thereof, a flange 14, which in service extends on the inner side of the head of the rail A. The flange 14, as best seen in Fig. 2 of the drawings, is thin throughout the major portion of its length, and merges into a thickened flange or nose 15 at the forward end of the shoe. The nose 15 resembles in the essential the flange of the wheel B, and serves as a guide for the shoe entering the switches and crossings, as would the flange of a wheel.

The flange 14 is drawn out at the rear of the body of the shoe, to form an inclined surface 16 connected with the tongue 17. The inclined surface 16 operates as a guide to receive the flange of the wheel B, to wedge the same laterally to pass within the flange 14, forcing the same against the side of the head of the rail A.

In service position, the wheel rests, as seen best in Fig. 1, at the foot of the inclined portion 11. In service, the shoe is employed on an inclined section of the track bed, where, to check the speed of the cars, the wheels are usually spragged. As the cars are slid down the track-bed, the nose 15 of each shoe projecting in front of the wheel B engages the flanges of a frog, as shown in Figs. 5 and 6, and is deflected thereby. The shoe, being so deflected in advance of the wheels B mounted thereon, turns under the said wheels, pivoting at approximately the point marked "X," shown in the said Figs. 5 and 6. It will be noted that the length of the shoe is sufficient to completely bridge the frog and switch gaps in the road-bed, so that the point on the shoe carrying the weight of the wheel, as, for instance, the point marked "X" in Figs. 5 and 6, has passed over the gap prior to the tongue 17 leaving the rearmost member forming the gap, and subsequent to the forward portion of the body 13 reaching the foremost member forming the gap. In this manner, the passage of the car over frog and switch gaps is insured.

In service, the shoes are installed by placing the same in advance of the wheels B, which wheels, on arriving at the tongue 17, ride thereover and pass upon the body of the said shoe. In riding onto the shoe described, the wheels are deflected to the inner side of the road-bed, being thus moved by the flanges of the wheels striking upon the inclined surface 16. The wheels are thus insured against riding on the flanges thereof over the said shoe. In the movement of the cars after the wheels have become seated on the shoes, it will be understood that the friction or slide is received upon the shoes direct.

It will thus be seen that by employing shoes of the character described, the wheels are saved from the wear to which they are now subjected when the cars are being slid over the tracks.

Having thus described my invention, I claim as new and desire to secure by Letters Patent:—

1. A car wheel slide shoe, having an elongated flat sliding body, said body having a rearwardly-extended tongue shaped to form an incline; an incline portion raised from said body, from adjacent the median portion thereof and extended toward the forward end of said body; and a guide flange for said body, rigidly secured thereto and extended therefrom to rest against the side of the head of a track rail, said flange being narrowed from the carrying position of a car wheel rearwardly, to form a guide for the flange of said car wheel when rolling upon said shoe.

2. A car wheel slide shoe, having an elongated flat sliding body, said body having a rearwardly-extended tongue shaped to form an incline; an incline portion raised from said body, from adjacent the median line thereof and extended toward the forward end of said body; and a guide flange for said body, rigidly secured thereto and extended therefrom to rest against the side of the head of a track rail, said flange being narrowed from the carrying position of a car wheel rearwardly, to form a guide for the flange of said car wheel, when rolling upon said shoe and the forward end of said flange being enlarged to a dimension substantially that of a car wheel and upwardly curved in simulation of a car-wheel flange.

3. A slide shoe of the character mentioned, having an elongated body portion adapted to rest upon the head of a track rail, said body portion having on one side a flange to rest against the inner side of a track rail, said flange and body portion being tapered toward the rear of the shoe to form guide members for disposing the wheel in proper riding position on the shoe.

In testimony whereof I have signed my name to this specification in the presence of two subscribing witnesses.

JAMES R. FLEMING.

Witnesses:
E. F. MURDOCK,
PHILIP D. ROLLHAUS.